United States Patent Office 3,826,709
Patented July 30, 1974

3,826,709
PROCESS FOR LAMINATING PHOSPHATE COATED STEEL WITH ABS RESIN
Darral V. Humphries, Allentown, Pa., assignor to Bethlehem Steel Corporation
No Drawing. Original application Sept. 2, 1969, Ser. No. 854,721, now abandoned. Divided and this application Apr. 25, 1972, Ser. No. 247,390
Int. Cl. B32b 27/30, 27/32
U.S. Cl. 161—217                1 Claim

ABSTRACT OF THE DISCLOSURE

In forming a coating of acrylonitrile-butadiene-styrene (ABS) resin on a phosphated steel surface, a primer of an ABS resin is first applied to the steel in the form of a solution. After evaporating the solvent from the primer solution, and fusing the solid primer to the metal, sheet ABS resin is applied and molded by heat and pressure to the primed steel surface.

---

This is a division of application Ser. No. 854,721, filed Sept. 2, 1969, now abandoned.

BACKGROUND OF THE INVENTION

Styrene polymer resins used for extrusion or injection molding are commonly formulated from reactor flake resin. Additives are generally included to promote stability and processability. A lubricating agent is usually added to the moldable grades of styrene polymers to permit easy release of the polymer from molds or dies. Particularly useful lubricants are certain metallic soaps. While a lubricant, or release agent, is usually necessary for efficient molding of a styrene polymer, the presence of the lubricant in the resin reduces the adhesion of the resin to metal reinforcements or substrates, such as steel wire or sheets.

In order to overcome the effect of the lubricant on the bonding of a styrene polymer sheet to a metal sheet, other synthetic resins, for example, epoxies and modified epoxies, are often used as a laminate between the resin and metal sheet to promote adhesion. With epoxies, some application problems may develop, due to high viscosity and limited pot life. Also, epoxies are relatively expensive. Furthermore, if it is desired to bond the resin with a metal insert or reinforcement during the molding or extrusion step, flow of the resin during processing tends to wipe the epoxy adhesive layer from the metal surface and a poor bond results.

Accordingly, it is an object of this invention to disclose a method by which a compatible resin can be laminated with steel in a tight bond.

It is another object to use as adhesive a material having non-wiping characteristics.

SUMMARY OF THE INVENTION

I have found that acrylonitrile-butadiene-styrene (ABS) resins can be laminated to a steel or other metal surface by the use of an intermediate layer of adhesive, which adhesive has substantially the same characteristics as the resin coating of the laminate. If the metal to be laminated is steel or zinc, the metal surface is first given a phosphate coating treatment. A solution of ABS resin in an organic solvent is then applied to the phosphated metal surface and allowed to dry, after which the resin is fused to the metal surface under controlled heat and pressure. To complete the formation of the laminated article, ABS resin, in the form of sheet or strip, for example, is placed over the ABS resin-primed metal and molded thereonto under heat and pressure.

DETAILED DESCRIPTION

Example 1

As an example of the manner in which metal can be laminated by the method of this invention, a low carbon steel sheet measuring 16 inches by 20 inches, and having a thickness of 0.009 inch, was given a phosphate treatment in a water solution of a proprietary phosphate composition in the well-known manner of producing an iron phosphate conversion coating on a steel surface. The proprietary compound in this instance was Granodine 1100, produced by Amchem Products, Inc.

The phosphate-coated sheet was next sprayed on one side with a solution containing reactor flake grade ABS resin. The resin solution was made by dissolving the ABS resin in a solvent of 3 parts diacetone alcohol and 1 part xylene. The resin represented 10% by weight of the solution. After evaporating all solvent from the sheet, the remaining resin was fused to the sheet at 400° F. for 2 minutes by induction heating to produce an adhesive bonding surface on one side of the steel sheet. The thus primed surface was then brought into contact with a 0.030-inch thick sheet of molding grade ABS resin. Another steel sheet, also primed on one side, was brought in contact (primed side) with the other side of the resin sheet. The resultant sandwich of ABS resin, laminated on both sides with steel sheet, was placed in a mold under a pressure of 1000 p.s.i.g. at a temperature of 350° F. for a period of 1 minute. The resultant laminated product exhibited excellent adherence between the ABS resin sheet and ABS resin adhesive, as well as between the adhesive and steel sheet.

Example 2

As another example by which the method of this invention may be employed, a low carbon steel sheet, 16 by 20 inches in area, was given a phosphate coating as in the first example. Each side of the metal sheet was sprayed with a primer solution of the same composition as that used in the first example. After drying the primer on the sheet, the primer was fused to the steel substrate at 400° F. for 2 minutes. Each side of the adhesive-primed sheet was brough in contact with a separate sheet of molding grade ABS resin of about 0.030-inch in thickness. The laminated article was placed in a mold and subjected to a pressure of 200 p.s.i.g. at 400° F. for 2 minutes.

In order to assign a numerical value to the degree of adhesion obtained for the product made by the process of this invention, the laminated sheet from Example 1 was subjected to a standard T-peel test. This test was performed as described in A.S.T.M. Specification 1876–61T (1961). In accordance therewith one-inch wide strips, seven inches long, were cut from the original specimen. The steel laminates were peeled back on both sides of the resin, one inch from the same end, and with the peeled ends held in the jaws of the test apparatus, both laminates were stripped from the remaining 6-inch length. The peel strength in pounds per linear inch was 35 for carbon steel skins and 40 for galvanized steel skins.

In another peel test, made to determine the peel strength of a known adhesive comprising 59.3% monostyrene, 34% polystyrene, 6% polyester and 0.7% diisopropyl-p-toluidene, the styrene components thus representing at least 93% of the adhesive mixture, the adhesive was applied to steel sheets prepared with a phosphate coating as in the above examples. ABS sheet resin was sandwiched between two primed steel sheets, and subjected to a bonding treatment under the same conditions as those used in Example 2, 200 p.s.i.g. pressure at 400° F. for 2 minutes. The peel strength could not be determined, as there was no bonding. The normally ductile ABS resin sheet and the adhesive prefixed to the steel sheet became embrittled during the intended bonding treatment, and consequently no bonding occurred.

It has been found that the ABS resin adhesive, fused to the metal substrate, meets the requirements of a practical adhesive primer for the lamination of metal with an ABS resin outer layer, whereas other resins, including other styrene types, will not. The ABS adhesive, besides being a low cost material, is applied readily to the metal substrate. In the fused condition, it will not wipe off during application of the ABS resin outer layer, either during a molding or an extrusion step. The non-wiping feature is of utmost importance in producing a laminate by extrusion. Additionally, the complete compatibility of ABS resin adhesive with the ABS resin outer layer aids in a proper bonding of the two layers, even though the moldable or extrudable outer layer of resin contains the typical metallic soap type lubricant, added to aid in release from the metal mold.

While ferrous substrates are commonly used in conjunction with synthetic resin coatings, this invention is not restricted to such substrates. For example, metal surfaces such as zinc (galvanized steel) or aluminum when phosphated can be primed with ABS resin sheet. Galvanized surfaces can be primed in the absence of a phosphate coating, although the phosphated surface is preferred.

In applying the adhesive primer to the substrate in the form of a solution, flake grade ABS resin is preferred, merely because of ease of handling and availability. However, any grade of ABS resin may be used, provided that it is virgin material and is relatively free from deleterious additions.

While numerous organic solvents are available for the formation of the adhesive solution such as esters and chlorinated hydrocarbons, ketones are found to be most satisfactory. A compound such as xylene may be added to the ketone in a quantity sufficient to prevent too rapid drying. Too rapid evaporation of the solvent could result in uneven distribution of the resin on the substrate.

The concentration of the primer solution is not critical except that it must contain sufficient resin to produce a dry film thickness which will adhere to the steel. There is no upper limit for concentration as long as the solution is sufficiently fluid to be applied to the steel surface uniformly. With a 10% by weight solution of resin, the dry film thickness on the steel sheet produced by a single spraycoat is about 0.0002 inch.

The primer solution may be applied to the metal sheet by either roller coating or immersion, in place of spraying.

In fusing the ABS resin primer to the metal substrate, the required temperature will generally be between about 230° and 400° F., the higher temperature being preferred because of the more rapid processing resulting therefrom. A time of from 1 to 3 minutes is usually preferred.

The temperature required for the laminating of the resin sheet to the adhesive primed metal surface will also range, preferably, between 300° and 400° F. Sufficient heat must be applied to raise the temperature of the metal substrate to the fusion temperature of the resin—about 1 minute at 400° F. for 0.015-inch thick steel sheet—and to effect fusion of both the primer and the resin sheet surface in contact with the primer. Temperatures much above 400° F. are undesirable, since the resin may be thermally degraded and/or the phosphate coating deformed. Induction heating is considered the most suitable for the fusing and molding operations, but other methods, such as hot air heating have been used. Pressure for molding the laminate should be not less than about 10 p.s.i.g. at a minimum time of about 1 minute. A practical operating time range is from 2 to 10 minutes.

The products produced by the process of this invention have a variety of uses. Metal panels coated on one side with ABS resin can be used for decorative purposes. Panels of the sandwich type find use in the building trades, for forming trailer bodies, refrigerator panels, etc.

I claim:

1. A plastic-metal composite comprised solely of a metal substrate selected from the group consisting of ferrous metal, zinc or galvanized ferrous base metal and a unitary layer of acrylonitrile-butadiene-styrene resin of substantially uniform composition throughout and characterized by a smooth strongly bonded interface between the metal and the plastic exhibiting without mechanical interlocking between the metal substrate and the plastic layer a bonding strength equivalent to a sandard T-peel laminate bonding strength of at least 35 pounds per linear inch wherein the plastic-metal composite is produced by a process comprising applying a phosphate coating to the metal substrate, applying a solution of acrylonitrile-butadiene-styrene resin in a volatile organic solvent to the metal article to form a film of the resin on the surface of the phosphate coated metal substrate, drying the film to expel the solvent, heating the resin film layer to a temperature of not less than 230° F. for a time sufficient to fuse the resin film layer to the said metal substrate and applying a preformed layer of acrylonitrile-butadiene-styrene resin to the resin film layer at a temperature of not less than 300° F. and a pressure of not less than about 10 p.s.i.g. for a time sufficient to form a uniform integral layer of acrylonitrile-butadiene-styrene bonded directly to the smooth surface of the metal substrate.

References Cited

UNITED STATES PATENTS

| | | | |
|---|---|---|---|
| 2,817,618 | 12/1957 | Hahn | 156—242 X |
| 3,468,834 | 9/1969 | Oda et al. | 260—881 X |
| 3,617,364 | 11/1971 | Jarema | 117—132 B |
| 3,257,260 | 6/1966 | Morgan | 161—69 |
| 2,587,430 | 2/1952 | Baldwin | 161—217 X |
| 3,598,630 | 8/1971 | Doty et al. | 156—3 X |

HAROLD ANSHER, Primary Examiner

U.S. Cl. X.R.

117—49, 132 CB; 156—3, 306, 331; 161—218, 225